(12) United States Patent
Hsu

(10) Patent No.: US 6,503,001 B1
(45) Date of Patent: Jan. 7, 2003

(54) SHUTTER DRIVING MECHANISM FOR CAMERA

(75) Inventor: Joe Hsu, Taipei Hsien (TW)

(73) Assignee: Focus Products Company Limited, Taipei Hsien (TW)

( * ) Notice: Subject to any disclaimer, the term of this patent is extended or adjusted under 35 U.S.C. 154(b) by 0 days.

(21) Appl. No.: 09/972,974

(22) Filed: Oct. 10, 2001

(51) Int. Cl.[7] .................................................. G03B 9/10
(52) U.S. Cl. ........................................... 396/493; 396/6
(58) Field of Search ................................ 396/401, 443, 396/493, 6, 502

(56) References Cited

U.S. PATENT DOCUMENTS

| | | | | |
|---|---|---|---|---|
| 4,193,678 A | * | 3/1980 | In Son ........................ 396/401 |
| 5,381,200 A | * | 1/1995 | Takagai ....................... 396/493 |
| 5,630,176 A | * | 5/1997 | Yamashina et al. ......... 396/493 |
| 5,899,588 A | * | 5/1999 | Mikami ....................... 396/195 |
| 6,400,911 B1 | * | 6/2002 | Schroder .................... 396/401 |

\* cited by examiner

Primary Examiner—Alan A. Mathews
(74) Attorney, Agent, or Firm—Rosenberg, Klein & Lee

(57) ABSTRACT

A camera shutter driving mechanism includes a film-driven ratchet mechanism rotated by a film moving through a film passage in a camera, and a shutter release sensing mechanism located adjacent to and rotated by the film-driven ratchet mechanism to convert an axial pressure applied on a shutter release button into a rotary force that is acted on a link via a pull arm of the shutter release sensing mechanism, so that the link is moved horizontally to cause pivotal turning of a shutter blade from a closed position into an open position to admit external light into the camera.

6 Claims, 8 Drawing Sheets

SHUTTER DRIVING MECHANISM FOR CAMERA

BACKGROUND OF THE INVENTION

1. Field of the Invention

The present invention relates to a camera structure, and more particularly to a shutter driving mechanism for a camera.

2. Description of the Prior Art

A camera generally includes a casing, a film cartridge chamber, a film take-up chamber, a taking lens, a viewfinder, a shutter, a shutter release button, a shutter driving mechanism, and other related parts. When. a user pushes the shutter release button, external light is allowed to pass through the taking lens to present an image on the film.

When the user pushes the shutter release button, such movement of pushing is transferred via the shutter driving mechanism to cause opening of a shutter blade for a very short time to admit external light into the camera. Therefore, the shutter driving mechanism plays a very important role in the camera. Some of the conventional shutter driving mechanisms have very complicate structures and occupy considerable spaces in the camera, while others have simplified structure but less precise functions. Various parts included in the complicate shutter driving mechanisms are interdependent and therefore tend to cause failures of the shutter driving mechanisms. On the other hand, the simplified shutter driving mechanisms might be too simple to provide precise control of shutter.

SUMMARY OF THE INVENTION

It is therefore a primary object of the present invention to provide a camera shutter driving mechanism capable of precisely transferring a user's movement of pushing the shutter release button to control the opening or closing of shutter.

Another object of the present invention is to provide a camera shutter driving mechanism having simplified structure and limited number of components to occupy a reduced space in the camera.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
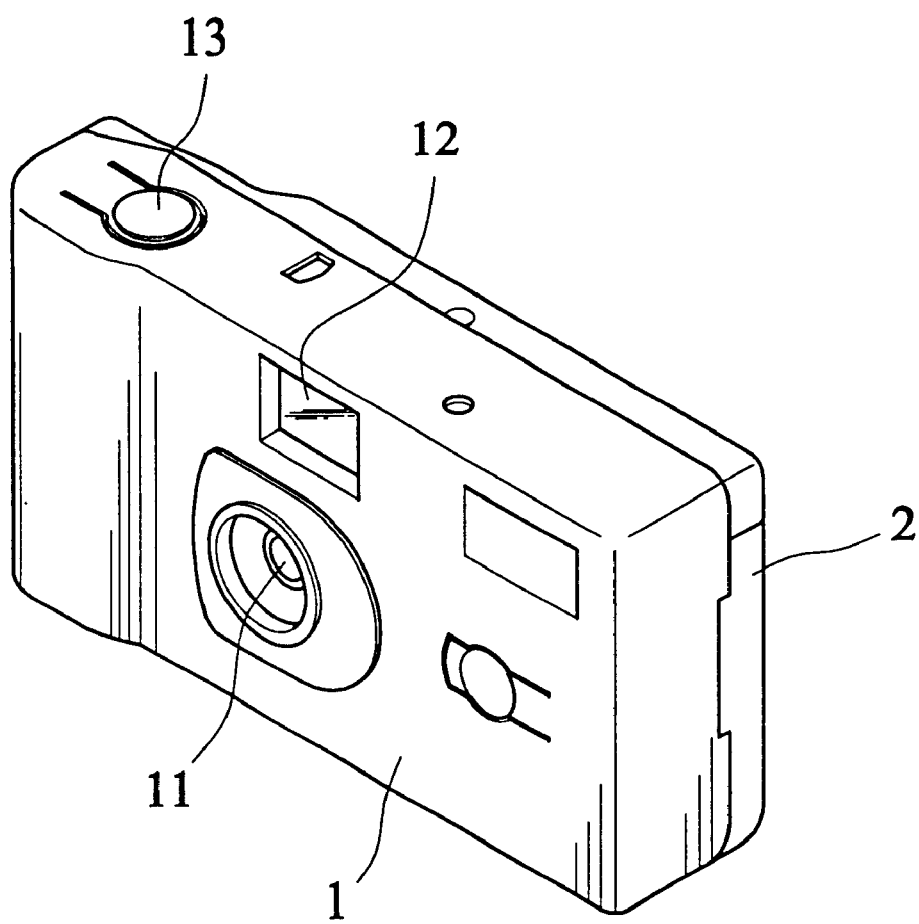
FIG. 1 a front perspective view of a camera having a shutter driving mechanism according to the present invention.

Please refer to FIG. 1 that illustrates a camera having a front cover 1 and a camera frame 2 that are connected together to define an internal space between them.

The front cover 1 is provided near a central area with an opening 11, via which external light needed to take a picture passes through a taking lens of the camera. A viewfinder 12 is provided on the front cover 1 above the opening 11. Moreover, the front cover 1 is provided at a predetermined position with an integrally formed shutter release button 13. When the shutter release button 13 is pushed, it will press against a shutter driving mechanism located in the front cover 1. The shutter driving mechanism will be described in more details latter.

Figure 2:
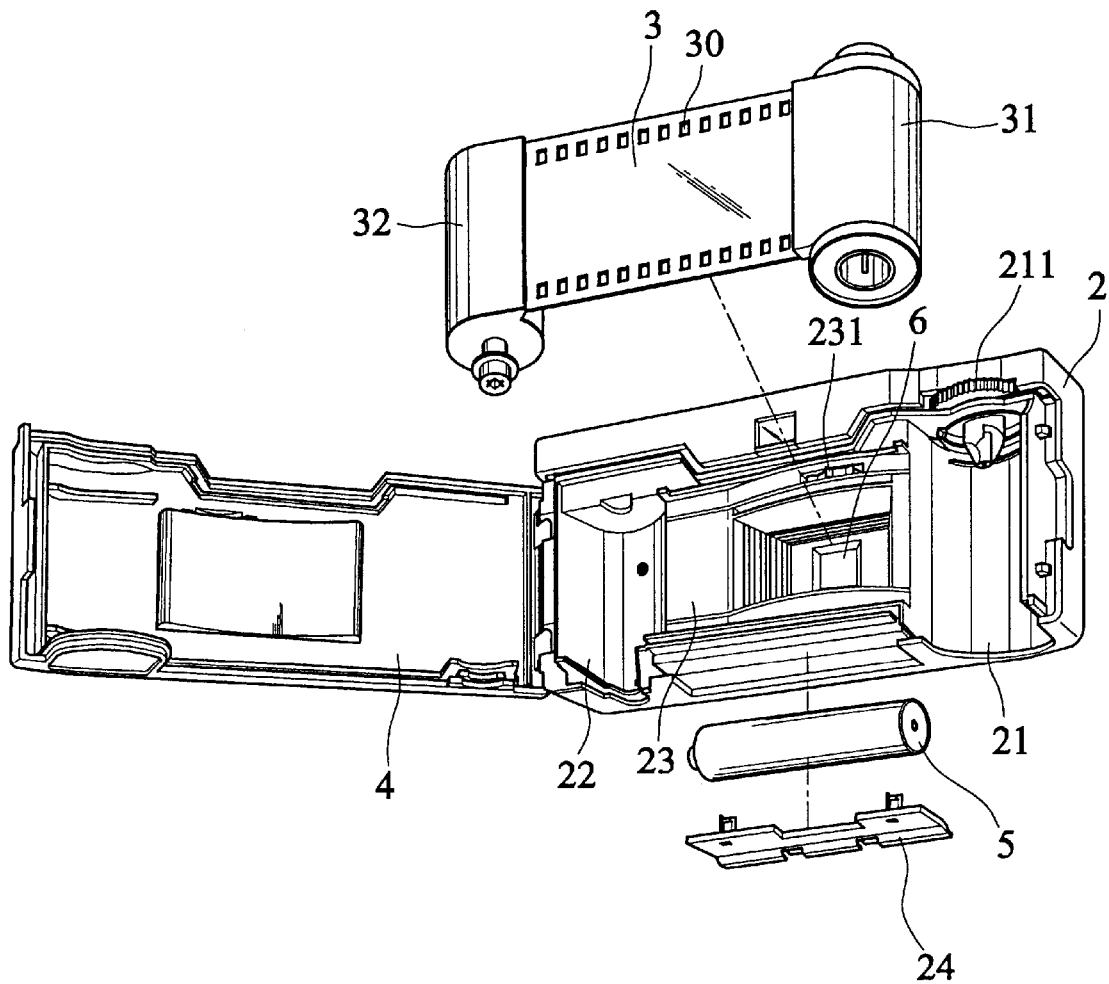
FIG. 2 is an exploded rear perspective view of a camera frame of the camera of FIG. 1.

As shown in FIG. 2 that is an exploded rear perspective view of the camera frame 2 of the camera, the camera frame 2 is provided at two ends of a rear side thereof with a film cartridge chamber 21 and a film take-up chamber 22, respectively, so that a film passage 23 is formed between the two chambers 21, 22. A film cartridge 31 having a film 3 wound therein can be positioned in the film cartridge chamber 21, and a leader of the film 3 in the film cartridge 31 may be drawn out to pass through the film passage 23 and connect to a film take-up reel 32 that is positioned in the film take-up chamber 22, so that the film 3 is set in the camera. The film 3 is provided along upper and lower edges with a line of sprocket holes 30 each.

The film cartridge chamber 21 is provided at a top with a film winding wheel 211 that may be turned by a user to wind the film 3 in the film cartridge 31.

A film-driven sprocket wheel 231 is provided near an upper side of the film passage 23 to slightly project into the film passage 23. When the film 3 is drawn to pass through the film passage 23, sprockets on the film-driven sprocket wheel 231 engage into the upper line of sprocket holes 30 on the film 3. Thus, when a user turns the film winding wheel 211 to wind the film 3, the film-driven sprocket wheel 231 is driven by the displacing film 3 to rotate.

At least one battery 5 is positioned in a battery compartment provided at a bottom of the camera frame 2 to supply power needed by the camera. The battery compartment is openably closed with a battery cover 24. A rear cover 4 is pivotally connected to the camera frame 2 for closing a rear side of the camera frame 2 to provide a close and light-tight space at the rear side of the camera frame 2.

Figure 3:
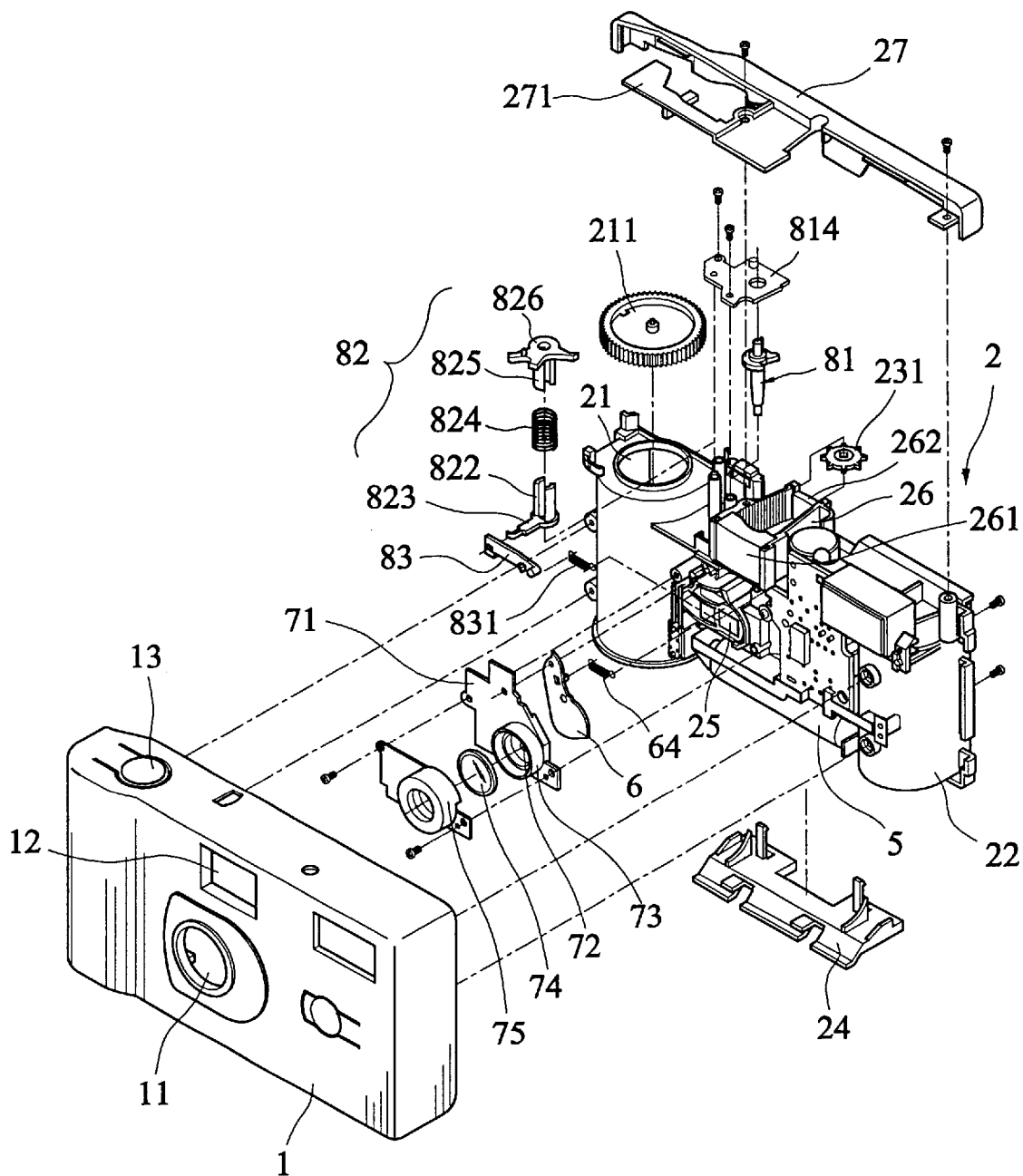
FIG. 3 is an exploded front perspective view of the camera of FIG. 1.
Figure 7:
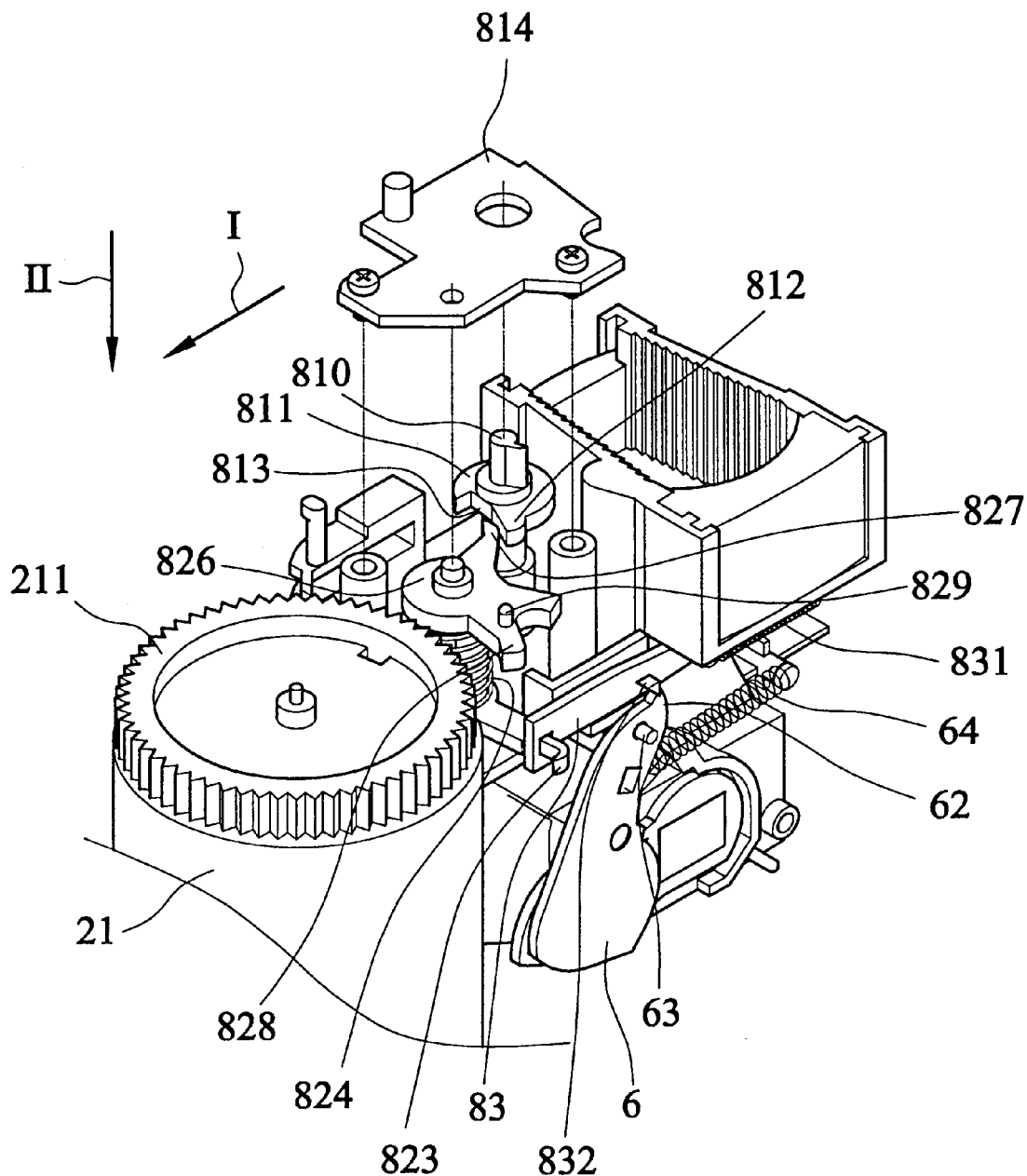
FIG. 7 shows movements of all related components of the camera shutter driving mechanism of FIG. 5 when the shutter blade thereof is in an open position.

Please refer to FIG. 3. The camera frame 2 is provided at a front side with a shutter opening 25. As can be clearly seen in FIG. 4, a flat shutter blade 6 having a shaft hole 61 and a claw 62 is located in front of the shutter opening 25 by engaging the shaft hole 61 with a locating shaft 63 fixed in the camera frame 2 above the shutter opening 25, such that the shutter blade 6 is pivotally rotatable about the locating shaft 63. When the shutter blade 6 is in a closed position to locate immediately in front of the shutter opening 25 to shield the latter, as shown in FIG. 5, the shutter blade 6 is pulled by a pullback spring 64 to remain in this position. And, when the shutter blade 6 is turned about the locating shaft 63 to an open position to offset from the shutter opening 25, as shown in FIG. 7, external light is permitted to pass through the shutter opening 25.

Please refer back to FIG. 3. A viewfinder frame 26 is provided in the camera frame 2 above the shutter blade 6 and includes a front lens 261 and a rear lens 262. The front lens 261 is in a position fitly corresponding to the viewfinder 12 on the front cover 1.

There is a shutter cover 71 mounted in front of the shutter blade 6. The shutter cover 71 includes a taking lens aperture 72 provided at a central area thereof, and a forward projected ring-shaped taking lens holder 73 surrounding the taking lens aperture 72 for holding a taking lens 74 therein. A taking lens cover 75 is then fixed onto the shutter cover 71 to locate the taking lens 74 in the taking lens holder 73.

There is also a shutter actuating mechanism 8 provided above the shutter blade 6 for controlling movement of the shutter blade 6. A top cover 27 is provided to cover entire top of the camera frame 2. The top cover 27 includes an extension arm 271 that is located below the shutter release button 13 on the front cover 1 and above the shutter actuating mechanism 8.

Figure 4:
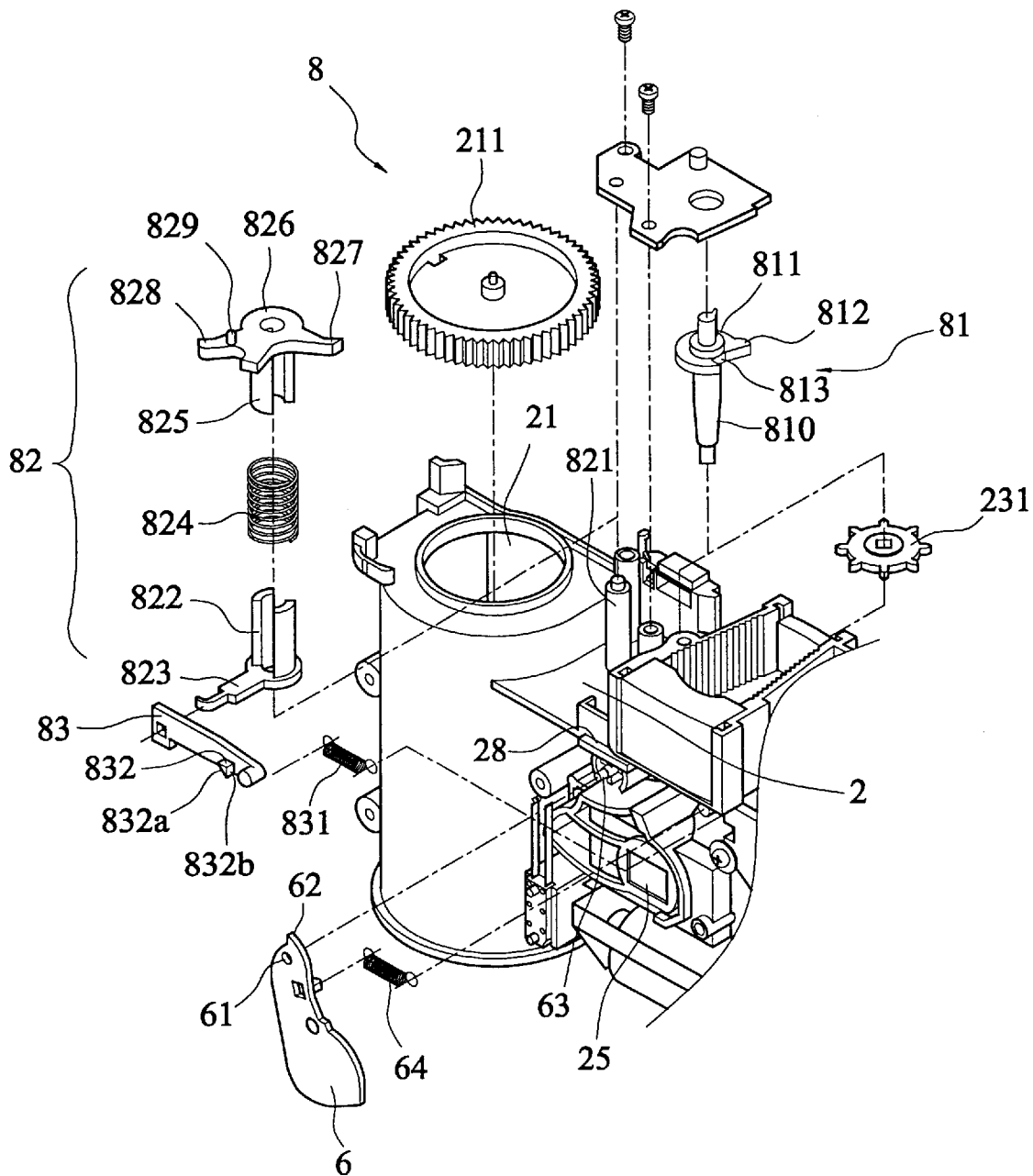
FIG. 4 is a fragmentary, enlarged exploded perspective view of FIG. 3 showing the camera shutter driving mechanism of the present invention.
Figure 5:
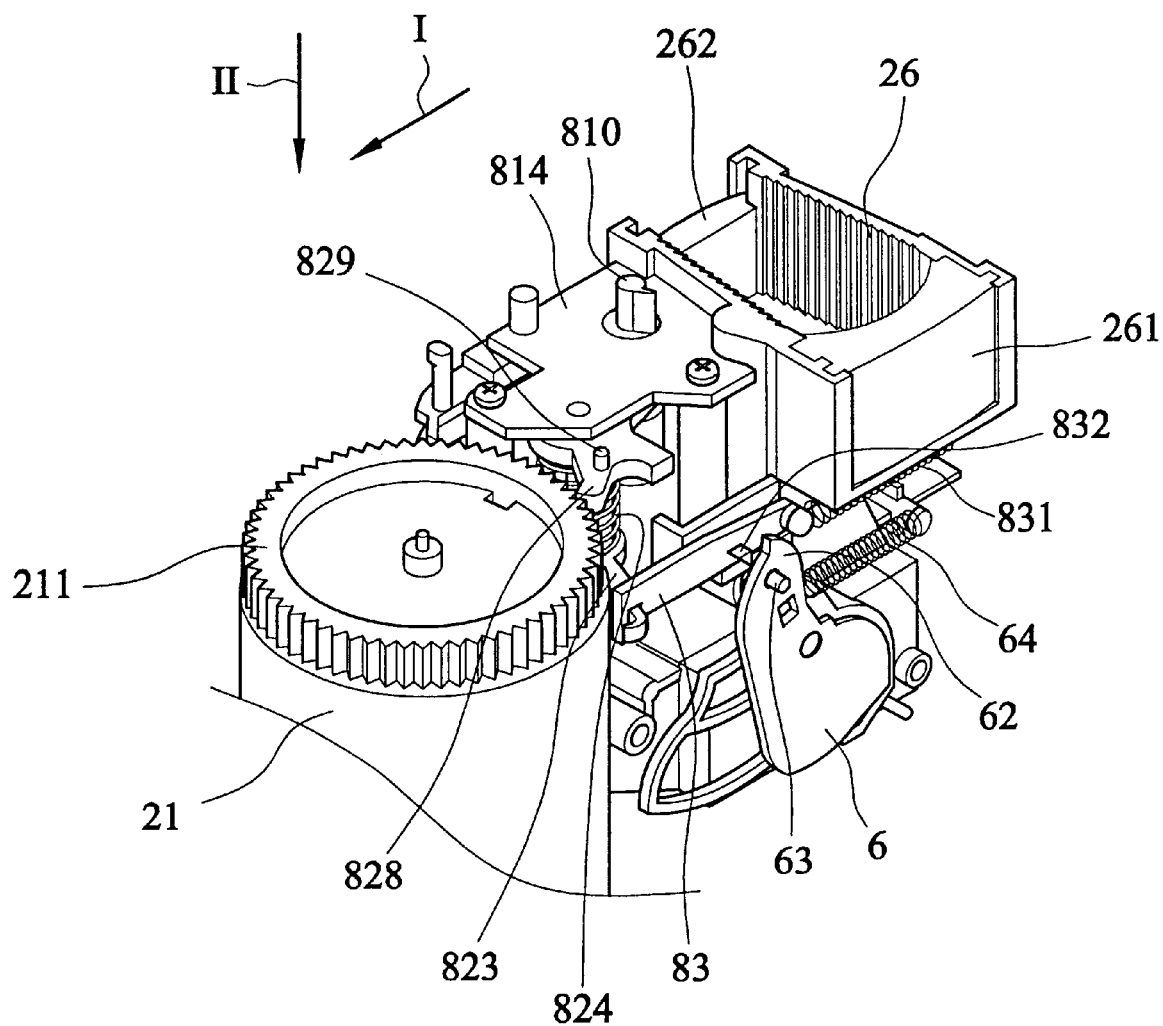
FIG. 5 is an assembled perspective view of the camera shutter driving mechanism of FIG. 4 viewed from another angle thereof.

Please refer to FIGS. 3 to 5 at the same time. The shutter actuating mechanism 8 includes a film-driven ratchet mechanism 81, a shutter release sensing mechanism 82 located adjacent to the film-driven ratchet mechanism 81, and a link 83.

The film-driven ratchet mechanism 81 includes a shaft 810 coaxially connected to the film-driven sprocket wheel 231, and a ratchet disc 811 provided at an upper part of the shaft 810. The ratchet disc 811 is provided at its peripheral edge with a curved projection 812 and a recess 813 adjacent to the projection 812. When the film 3 is wound and drives the film-driven sprocket wheel 231 to turn, the shaft 810 and the ratchet disc 811 coaxially connected to the film-driven sprocket wheel 231 rotate at the same time.

The shutter release sensing mechanism 82 includes a post 821 vertically fixed in the camera frame 2, a first coupler 822 movably mounted around the post 821, a pull arm 823 radially extended from a lower periphery of the first coupler 822 and having a hook-like free end, a spring 824 put around the first coupler 822, a second coupler 825 mounted around the post 821 to vertically slidably engage with the first coupler 822, a top disc 826 formed at a top of the second coupler 825, a first lever 827 projected from a peripheral edge of the top disc 826 toward the ratchet disc 811 of the film-driven ratchet mechanism 81 to contact with the curved projection 812, a second lever 828 projected from the peripheral edge of the top disc 826 toward the film winding wheel 211 to contact with teeth provided on a circumferential surface of the wheel 211 and to contain a predetermined angle between it and the first lever 827, and a stud 829 upward projected from a top of the second lever 828 to locate below the extension arm 271 of the top cover 27 of the camera frame 2.

A locating plate 814 is provided in the camera frame 2 above the film-driven ratchet mechanism 81 and the shutter release sensing mechanism 82, so that the shaft 810 of the film-driven ratchet mechanism 81 and the post 821 of the shutter release sensing mechanism 82 are fixed at their upper end to the locating plate 814.

The link 83 is coupled at a first end with the hook-like free end of the pull arm 823 at the bottom of the first coupler 822, and at a second end with a pullback spring 831 fixed in the camera frame 2. When the pull arm 823 is swung, it pulls the link 83 to move along a horizontal channel 28 provided in the camera frame 2 in a first direction I. The link 83 is provided near a middle portion of a front side facing the shutter blade 6 with a forward protrusion 832 to detachably abut on the claw 62 of the shutter blade 6. In the illustrated embodiment of the present invention, the protrusion 832 is in the form of a triangular stub having a bevel surface 832a facing toward the first end of the link 83, and a vertical wall 832b facing toward the second end of the link 83.

Figure 6:
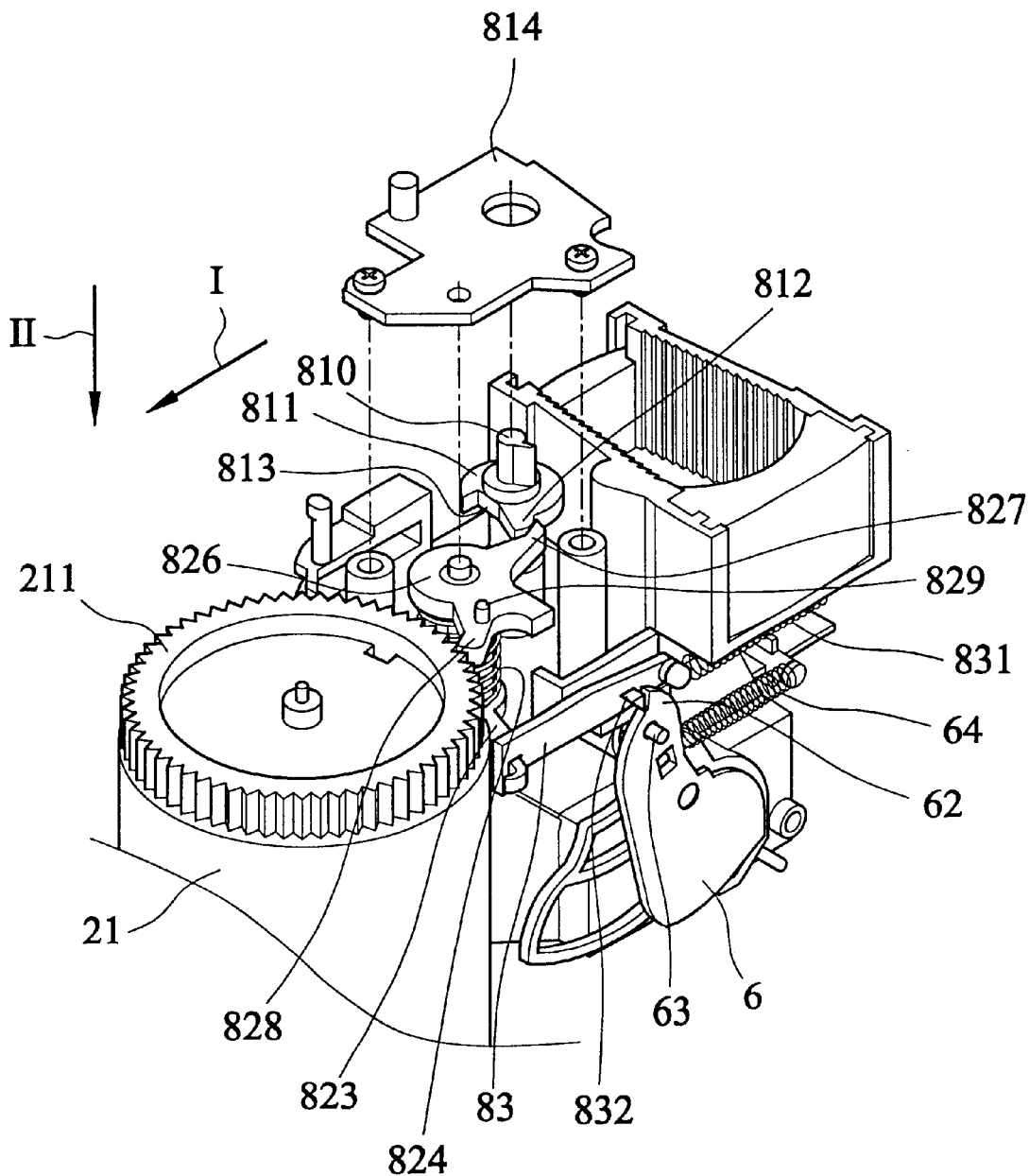
FIG. 6 shows movements of all related components of the camera shutter driving mechanism of FIG. 5 when a shutter blade thereof is in a closed position.
Figure 8:
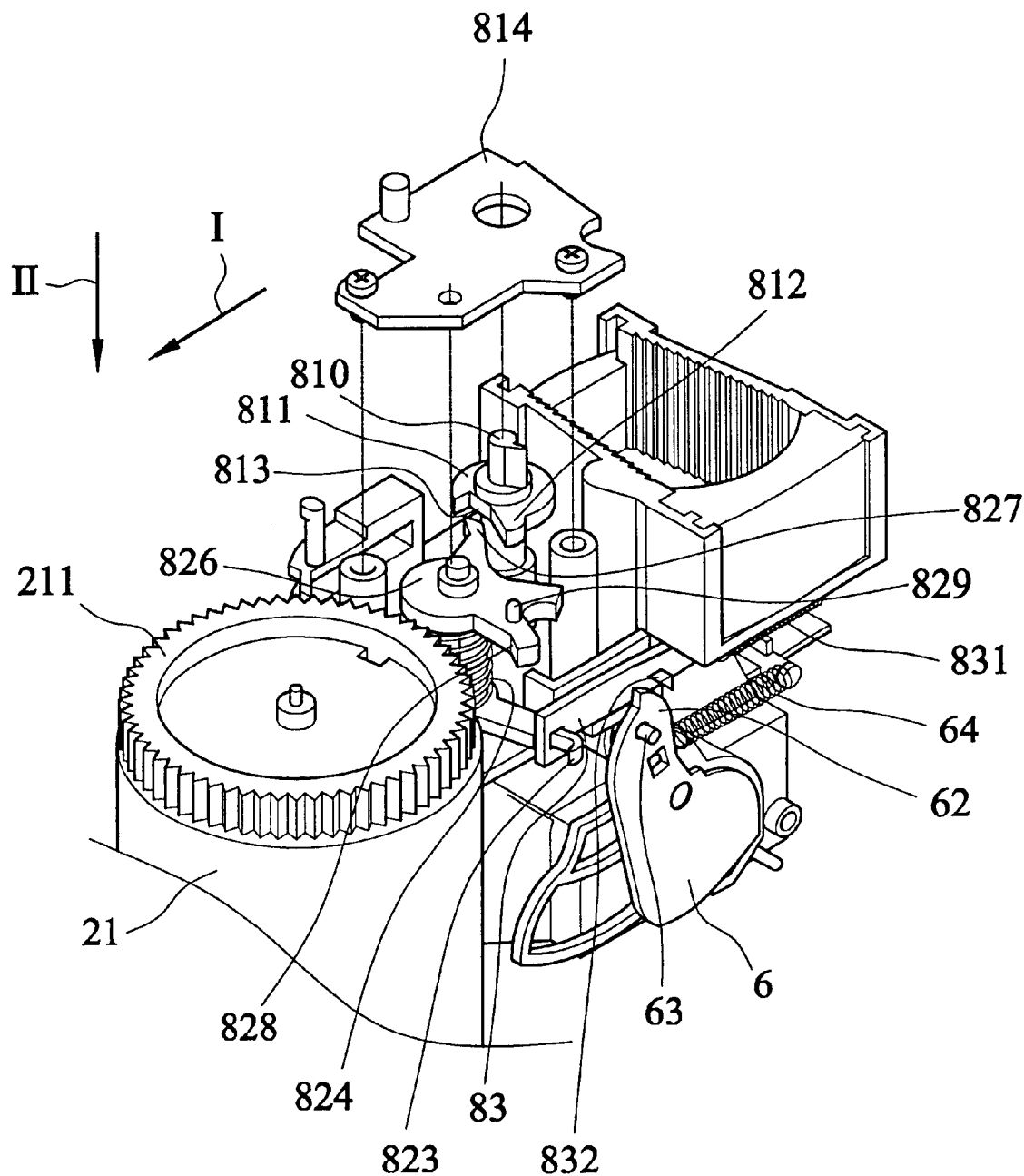
FIG. 8 shows movements of all related components of the camera shutter driving mechanism of FIG. 5 when the shutter blade thereof is returned from the open position to the closed position.

Please refer to FIGS. 6 to 8. When a user turns the film winding wheel 211, the film 3 is wound to displace in the film passage 23 and drives the film-driven sprocket wheel 231 and accordingly the shaft 810 coaxially connected to the film-driven sprocket wheel 231 to rotate counterclockwise. Since the top disc 826 of the shutter release sensing mechanism 82 is in contact with the ratchet disc 811 of the film-driven ratchet mechanism 81, it is brought by the latter to rotate by an angle at the same time.

When the film 3 displaces a distance equal to a standard frame, the curved projection 812 on the ratchet disc 811 is turned into a position of pressing against the first lever 827 of the top disc 826. At this point, a free end of the second lever 828 of the top disc 826 is moved into a position between two teeth on the film winding wheel 211, stopping the film winding wheel 211 from moving any further.

When the top disc 826 rotates, it brings the pull arm 823 to rotate clockwise at the same time, causing the link 83 connected at the first end to the free end of the pull arm 823 to move in the first direction I. When the bevel surface 832a of the triangular stub 832 on the link 83 passes over a top of the claw 62 of the shutter blade 6, the vertical surface 832b of the triangular stub 832 will abut on a left side of the claw 62, as shown in FIG. 6.

When the user pushes the shutter release button 13, the latter depresses the extension arm 271 of the top cover 27 for the same to press against the stud 829 on the second lever 828 of the top disc 826, causing the entire top disc 826 to axially descend in a second direction II to finally separate the first lever 827 of the top disc 826 from the curved projection 812 of the ratchet disc 811. At this point, the link 83 is pulled by a restore force of the pullback spring 831 to move in a direction opposite to the first direction I. When the link 83 is moved toward the pullback spring 831, the vertical wall 832b of the triangular stub 832 on the link 83 pushes the claw 62 of the shutter blade 6, causing the latter to turn about the locating shaft 63 by a predetermined angle to the open position to expose the shutter opening 25, as shown in FIG. 7, so that external light is admitted through the shutter opening 25.

When the link 83 is pulled by the pullback spring 831 to a dead point, the triangular stub 832 is moved beyond and separates from the claw 62 of the shutter blade 6, and the latter is pulled by the pullback spring 64 back to the closed position, as shown in FIG. 8.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A camera shutter driving mechanism mounted in a camera frame adjacent to a film cartridge chamber thereof for driving a shutter blade of the camera into a closed or an open position to respectively shield or expose a shutter opening formed on the camera frame, comprising:

a shutter release button mechanism having an shutter release button;

a film-driven ratchet mechanism being associated with a film-driven sprocket wheel, said film-driven sprocket wheel being partially projected into a film passage formed in said camera frame to mesh said film-driven sprocket wheel with at least one sprocket hole formed on a film extended through said film passage and thereby being driven to rotate by said film when the film is displaced along said film passage, and said film-driven sprocket wheel in rotating being adapted to bring said film-driven ratchet mechanism to rotate;

a shutter release sensing mechanism being located adjacent to said film-driven ratchet mechanism to be driven to rotate by said film-driven ratchet mechanism, so as to convert an axial pressure applied on said shutter release button mechanism into a rotary force to act on a pull arm; and a link being movably set in a horizontal channel provided in said camera frame, and having a first end connected to said pull arm of said shutter release sensing mechanism and a second end connected to a pullback spring fixed in said camera frame, said link being provided near a middle part of a front side facing toward said shutter blade with a protrusion adapted to touch and move said shutter blade;

whereby when said film is moved through said film passage and drives said film-driven ratchet mechanism to rotate, said shutter release sensing mechanism and said pull arm thereof are caused to rotate by a predetermined angle to move said link toward said first end in a first direction until said film has been moved by a predetermined distance and said shutter release sensing mechanism is stopped from rotating any further; and when said shutter release button of said shutter release button mechanism is pushed, said shutter release sensing mechanism is descended to separate from said film-driven ratchet mechanism, allowing said pullback spring to pull said link toward said second end in a direction opposite to said first direction and said protrusion on said link to push against and pivotally turn said shutter blade by a predetermined angle from said closed position into said open position, so that said shutter opening is opened for a very short time.

2. The camera shutter driving mechanism as claimed in claim 1, wherein said film-driven ratchet mechanism comprises:

a shaft being coaxially connected to said film-driven sprocket wheel;

a ratchet disc being formed at an upper part of said shaft;

a curved projection being formed at a peripheral edge of said ratchet disc; and a recess being formed at the peripheral edge of said ratchet disc adjacent to said curved projection.

3. The camera shutter driving mechanism as claimed in claim 1, wherein said shutter release sensing mechanism comprises:

a vertical post;

a first coupler being movably mounted around said vertical post;

a pull arm being radially extended from a bottom periphery of said first coupler;

a second coupler being mounted around said vertical post to vertically slidably engage with said first coupler;

a spring being put around said vertical post to locate between said first and said second couplers;

a top disc being formed at a top of said second coupler;

a first lever being extended from a peripheral edge of said top disc toward said film-driven ratchet mechanism to contact with said curved projection of said film-driven ratchet mechanism; and a second lever being extended from the peripheral edge of said top disc to contain a predetermined angle between said second and said first levers.

4. The camera shutter driving mechanism as claimed in claim 3, wherein said second lever is provided on a top surface with an upward projected stud corresponding to said shutter release button.

5. The camera shutter driving mechanism as claimed in claim 1, wherein said shutter blade is a flat plate having a shaft hole for rotatably engaging with a locating shaft in said camera frame and a claw, and is connected to an end of a pullback spring fixed in said camera frame, and wherein when said shutter blade is in said closed position to shield said shutter opening, said shutter blade is pulled by said pullback spring to remain in said closed position, and when said shutter blade is pivotally rotated about said locating shaft into said open position, external light is admitted through said shutter opening.

6. The camera shutter driving mechanism as claimed in claim 1, wherein said protrusion on said link for touching and moving said shutter blade is a triangular stub.

* * * * *